United States Patent
Larsson et al.

(10) Patent No.: US 9,513,650 B2
(45) Date of Patent: Dec. 6, 2016

(54) METHOD IN AN ELECTRIC POWER SYSTEM, CONTROLLER, COMPUTER PROGRAMS, COMPUTER PROGRAM PRODUCTS AND ELECTRIC POWER SYSTEM

(71) Applicant: ABB Research Ltd., Zurich (CH)

(72) Inventors: Tomas Larsson, Vasteras (SE); Richard Rivas, Vasteras (SE); Stefan Thorburn, Vasteras (SE); Marguerite Holmberg, Vasteras (SE)

(73) Assignee: ABB Research Ltd., Zurich (CH)

( * ) Notice: Subject to any disclaimer, the term of this patent is extended or adjusted under 35 U.S.C. 154(b) by 418 days.

(21) Appl. No.: 14/137,082

(22) Filed: Dec. 20, 2013

(65) Prior Publication Data
US 2014/0114495 A1  Apr. 24, 2014

Related U.S. Application Data

(63) Continuation of application No. PCT/EP2011/060496, filed on Jun. 22, 2011.

(51) Int. Cl.
*G06F 19/00* (2011.01)
*G05F 1/66* (2006.01)
(Continued)

(52) U.S. Cl.
CPC .............. *G05F 1/66* (2013.01); *H02J 3/1828* (2013.01); *H02J 3/24* (2013.01); *Y02E 40/30* (2013.01)

(58) Field of Classification Search
USPC .................................................. 700/292, 286
See application file for complete search history.

(56) References Cited

U.S. PATENT DOCUMENTS 6,338,009 B1 * 1/2002 Sato .......................... H02J 3/24
  700/286
7,345,373 B2 * 3/2008 Delmerico ............ F03D 7/0272
  290/44

(Continued)

FOREIGN PATENT DOCUMENTS

EP  1887674 A1  2/2008

OTHER PUBLICATIONS

Künisch, et al.; "Battery Energy Storage Another Option for Load-Frequency-Control and Instantaneous Reserve"; IEEE Transaction on Energy Conversion, vol. EC-1, No. 3, Sep. 1986, pp. 41-46.
(Continued)

*Primary Examiner* — Kidest Bahta
(74) *Attorney, Agent, or Firm* — Whitmyer IP Group LLC

(57) ABSTRACT

The invention relates to a method in an electric power system including one or more power generation source(s) and a dynamic power compensator having a battery energy storage. The method includes the steps of: detecting a frequency disturbance within the electricity power system requiring an additional power generation source to be connected to the electricity power system in order to meet a power demand; and controlling the power output from the battery energy storage of the dynamic power compensator during start-up of the additional power generation source thereby limiting the frequency disturbance within the electric power system. The invention also relates to a controller, computer program, computer program products and electric power system.

16 Claims, 4 Drawing Sheets

(51) Int. Cl.
   *H02J 3/18*    (2006.01)
   *H02J 3/24*    (2006.01)

(56) References Cited

U.S. PATENT DOCUMENTS

| | | | | |
|---|---|---|---|---|
| 8,922,056 B2* | 12/2014 | Thisted | .................... | H02J 7/34 307/18 |
| 2002/0039299 A1 | 4/2002 | Nishimura et al. | | |
| 2005/0012395 A1* | 1/2005 | Eckroad | .................... | H02J 3/16 307/44 |
| 2009/0240382 A1* | 9/2009 | Mitani | .................... | H02P 9/105 700/298 |
| 2010/0001698 A1 | 1/2010 | Johnson | | |
| 2010/0025994 A1 | 2/2010 | Cardinal et al. | | |
| 2010/0157634 A1 | 6/2010 | Yu et al. | | |
| 2010/0320842 A1 | 12/2010 | Beck | | |
| 2011/0285130 A1* | 11/2011 | Thisted | ................. | F03D 7/0224 290/44 |
| 2012/0310426 A1* | 12/2012 | Tarnowski | ............ | F03D 7/0272 700/287 |
| 2012/0313593 A1* | 12/2012 | Knuppel | ............... | F03D 7/0284 323/234 |

OTHER PUBLICATIONS

Taylor, "Update on the Puerto Rico Electric Power Authority's Spinning Reserve Battery System", © 1996 IEEE, pp. 249-252.
International Preliminary Report on Patentability Application No. PCT/EP2011/060496 Completed: Jun. 3, 2013 14 pages.
International Search Report and Written Opinion of the International Searching Authority Application No. PCT/EP2011/060496 Completed: Mar. 2, 2012; Mailing Date: Mar. 16, 2013 10 pages.

* cited by examiner

METHOD IN AN ELECTRIC POWER SYSTEM, CONTROLLER, COMPUTER PROGRAMS, COMPUTER PROGRAM PRODUCTS AND ELECTRIC POWER SYSTEM

FIELD OF THE INVENTION

The invention relates generally to the field of electrical power systems and in particular to frequency support within such electrical power systems.

BACKGROUND OF THE INVENTION

Users of an electrical power system expect a reliable power supply therefrom and there are various ways for ensuring an un-interrupted operation of the electrical power system. For example, the electrical power system should be designed so that even if its largest single power generation source is lost, the overall balance between electricity production and consumption should still be kept.

A loss of a generation source in the electrical power system will cause the system frequency to drop. Other power generation sources may increase their production to compensate for the lost generation source's power contribution to the power generation. In order to recover the electrical power system to a stable situation and thereby avoid service interruption, other conventional energy generation sources thus have to be engaged. Such sources, e.g. gas turbines, diesel engines, steam turbines, hydro power etc., need a start-up time and have limitations in reliability. For example, thermal power plants respond relatively slowly due to difficulty to increase temperatures fast enough in boilers without putting mechanical stress upon them. Other power generation sources have other limitations, e.g. gas turbines, although having fast response times, have lower efficiency and thus higher production costs.

In view of the above, it would be desirable to improve the handling of frequency disturbances when bridging over between an initial frequency drop and steady state following a recovery.

SUMMARY OF THE INVENTION

An object of the invention is to provide means and methods for improving the transitional stage upon detecting a frequency drop within the electrical power system requiring additional power generation sources to be activated.

The object is according to a first aspect of the invention achieved by a method in an electric power system comprising one or more power generation source(s) and a dynamic power compensator having a battery energy storage. The method comprises the steps of: detecting a frequency disturbance within the electricity power system requiring an additional power generation source to be connected to the electricity power system in order to meet a power demand; and controlling the power output from the battery energy storage of the dynamic power compensator during start-up of the additional power generation source, thereby limiting the frequency disturbance within the electric power system.

By means of the invention, power output from the battery energy storage is used for reducing frequency dips resulting e.g. from loss of a power generation source. The invention provides means and methods for rapidly handling short-term disturbances and provides a grid operator more time for start-up procedures of additional power generation sources. Power generation sources conventionally less suitable as back-up sources can thus be used, for example power generation sources having slow start-up procedures before reaching full capacity. Further, the battery energy storage can be dimensioned optimally, i.e. the installed energy in the battery energy storage may be minimized.

In an embodiment, the step of controlling the power output from the battery energy storage of the dynamic power compensator comprises controlling the power output in a peak mode.

In an embodiment, the method comprises the further step of controlling the battery energy storage in an endurance mode, during which the power output of the battery energy storage is utilized alone or in combination with power output from the additional power generation source during a start-up of the additional power generation source.

In the above embodiment, the power output from the battery energy storage may be controlled by frequency droop or by frequency deviation of the electric power system.

In an embodiment, the method comprises the further step of, after the endurance mode, ramping down the power output of the battery energy source until the additional power generation source is running at its full capacity.

In an embodiment, the method comprises a further step of ramping down the power output from the battery energy storage from the power output level of the peak mode to the power output level of the endurance mode.

In an embodiment, the peak mode comprises a first time period upon detection of the frequency disturbance, in which peak mode the battery energy storage is arranged to provide its full power output capacity to the electric power system.

In an embodiment, dynamic power compensator comprises a voltage source converter or a static synchronous compensator connected at a DC side thereof to the battery energy storage.

In an embodiment, the frequency disturbance results from the loss of one of the power generation sources.

The object is according to a second aspect of the invention achieved by a controller for controlling a dynamic power compensator having a battery energy storage, the dynamic power compensator being connected to an electric power system comprising one or more power generation source. The controller is arranged to: detect a frequency disturbance within the electricity power system requiring an additional power generation source to be connected to the electricity power system in order to meet a power demand; and control the power output from the battery energy storage of the dynamic power compensator during start-up of the additional power generation source, thereby limiting the frequency disturbance within the electric power system.

The object is according to a third aspect of the invention achieved by a computer program for a controller controlling a dynamic power compensator, the dynamic power compensator being connected to an electric power system. The computer program comprises computer program code, which, when run on the controller, causes the controller to perform the steps of: detecting a frequency disturbance within the electricity power system requiring an additional power generation source to be connected to the electricity power system in order to meet a power demand; and controlling the power output from the battery energy storage of the dynamic power compensator during start-up of the additional power generation source, thereby limiting the frequency disturbance within the electric power system.

The invention also encompasses a computer program product comprising a computer program as above, and a computer readable means on which the computer program is stored.

The object is according to a fourth aspect of the invention achieved by an electric power system comprising one or more power generation source(s) and a dynamic power compensator having a battery energy storage, the electric power system further comprising a controller arranged to connect, upon detection of a frequency disturbance within the electricity power system requiring an additional power generation source to be added to the electricity power system in order to meet a power demand, the battery energy storage to immediately provide output power to the electrical power system during start-up of the additional power generation source, thereby limiting the frequency disturbance within the electric power system.

Further features and advantages thereof will become clear upon reading the following description and the accompanying drawings.

DETAILED DESCRIPTION OF THE INVENTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
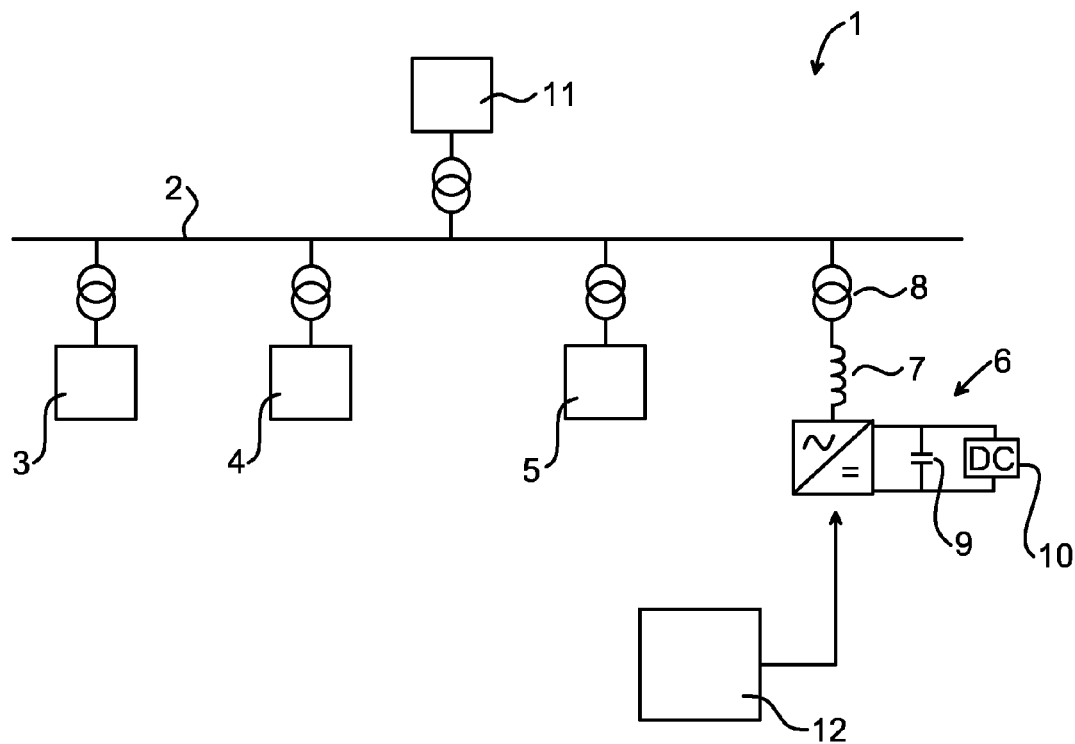
FIG. 1 illustrates schematically an environment in which embodiments of the invention may be implemented.

FIG. 1 illustrates schematically an environment in which embodiments of the invention may be implemented. In particular, an electric power system 1, in the following denoted power grid 1, comprises a power transmission network 2. The power transmission network 2 may comprise a single power transmission line or several such power transmission lines suitably interconnected.

A number of power generation sources 3, 4, 5 are connected to the power grid 1, typically via step-up transformers. The power generation sources 3, 4, 5 may for example comprise gas turbines, diesel engines, steam turbines, hydro power generators, wind power generators etc. One or more load(s) 11 consuming the generated power are also connected to the power transmission network 2, typically via step-down transformers.

Further, a dynamic power compensator 6, in the following denoted simply power compensator 6, is also connected to the power grid 1. The power compensator 6 may for example comprise a static synchronous compensator (STATCOM). The power compensator 6 is on its AC side connected to the power grid 1, typically via a reactor 7 and transformer 8. The power compensator 6 may on its DC side be connected to a capacitor bank 9. The power compensator 6 further comprises a battery energy storage 10, connected to it on its DC side, and connected in parallel to the capacitor bank 9. The battery energy storage 10 may comprise a Li-ion battery system comprising one or more strings of battery units.

A controller 12 is arranged to control the power compensator 6, and comprises in particular means for controlling the battery energy source 10 thereof, as will be described later. The controller 12 is arranged to receive inputs from remote measurement devices (not illustrated) such as voltage transformers and current transformers, typically provided via intelligent electronic devices. The controller 12 may also receive inputs from control systems such as SCADA (Supervisory Control And Data Acquisition) and/or battery management units arranged to measures different parameters of the battery energy storage 10, such as battery currents, cell- and battery voltages, temperature, and also the battery state-of-charge (SOC). The battery management units may also be arranged to perform cell balancing, handling internal communication between battery modules of the battery energy storage 10 and handle communication in order to send and receive data to/from the controller 12.

Briefly, in a conventional control scheme for controlling a power grid, spontaneous load variations are compensated within a couple of seconds by means of a primary control. The primary control thus provides local automatic control delivering power in response to smaller frequency changes. Such spontaneous, smaller load variations may for example be in the order of 0.5% of the power in the power grid. The conventional control scheme further comprises a secondary control, which is a centralized automatic control delivering power in order to restore frequency within the power grid from e.g. a larger loss of power generation source and following frequency disturbances. Such larger loss may for example comprise 2-3% power deviation. A frequency disturbance within the power grid due to such loss of power generation source typically requires an additional power generation source to be connected to the power grid in order to meet the power demand within the power grid. Such frequency disturbance resulting from a loss of power generation source can be detected in various ways, for example by measuring the frequency or equivalently frequency deviations within the power grid 1.

The conventional control scheme may comprise yet further control levels, such as tertiary control comprising manually set power dispatch orders and to manage congestions etc.

The power from the power compensator 6 and in particular the battery energy storage 10 thereof is available immediately in contrast to the conventional power generation sources 3, 4, 5. This fact is utilized in accordance with aspects of the invention.

Figure 2:
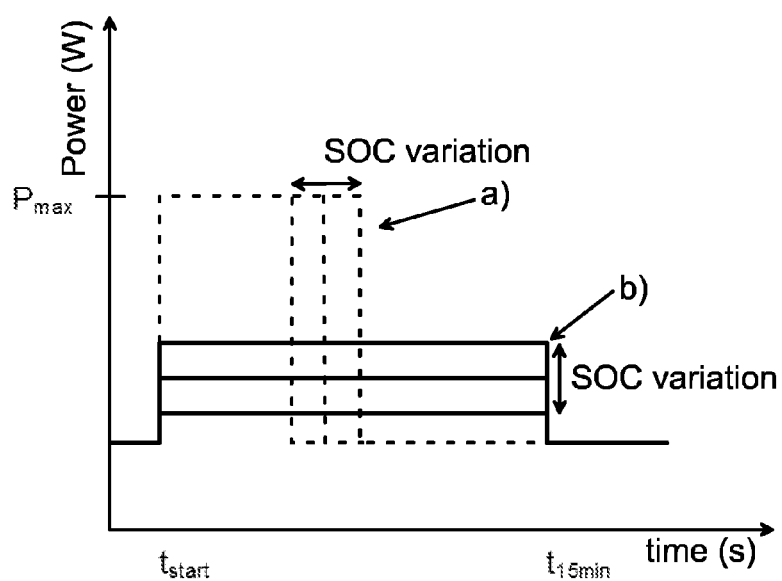
FIG. 2 illustrates different possible use modes of battery energy storage in dependence on its state of charge.

FIG. 2 illustrates different possible use modes of the battery energy storage 10 in dependence on its state of charge (SOC). The x-axis illustrates time and the y-axis output power from the battery energy storage 10. At a point of time, $t_{start}$, loss of power generation is detected and a following frequency drop in the power grid 1 occurs. At a) a first option is illustrated: use maximum power from the battery energy storage 10 for as long as the SOC of the battery energy storage 10 allows. At b) a second option is illustrated: enable energy support to be available during a pre-set specified time period, for example 15 minutes.

In an aspect of the invention, described with reference to FIGS. 3, 4, 5, and 6, the output from the battery energy storage is optimized during high or low frequency operating in the primary and secondary frequency control. When the frequency in the power grid 1 drops, certain actions are taken for controlling the battery energy storage 10.

Figure 3:
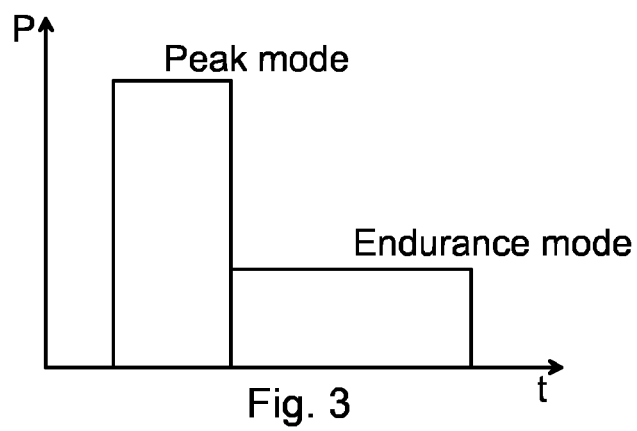
FIG. 3 illustrates definitions of peak mode and endurance mode of a battery energy storage.

The first stage after the frequency disturbance is defined as a peak mode, illustrated in FIG. 3. In this stage the battery energy storage 10 is immediately engaged in order to limit the initial frequency dip in the power grid 1 and the battery energy storage 10 is used by itself while waiting for the conventional power generation sources 3, 4, 5 to get started. The battery energy storage 10 thus provides an overbridging function to allow the conventional power generation sources 3, 4, 5 to get started and meanwhile provide the power required in the power grid 1.

In a next stage, an endurance mode, the battery energy storage 10 may be controlled so as to enter the endurance mode. The endurance mode is defined as a phase wherein the remaining energy in the battery energy storage is used by itself or in combination with the conventional power generation sources 3, 4, 5 until these latter have become fully engaged.

Figure 4:
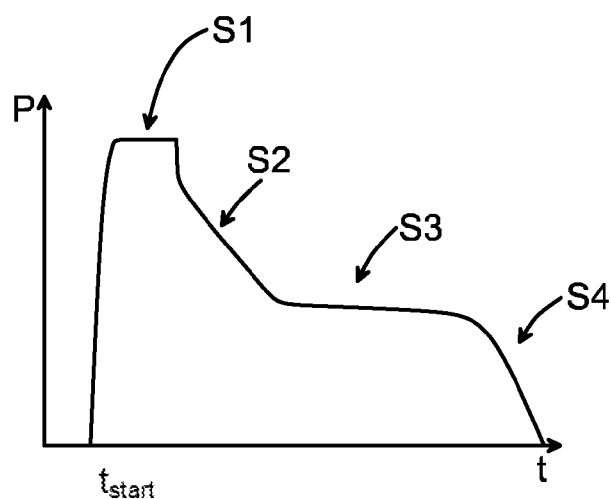
FIG. 4 illustrates a schematic sequence for operation of the battery energy storage.

FIG. 4 illustrates a schematic sequence for operation of the battery energy storage 10, illustrating power output P (y-axis) from the battery energy 10 as a function of time (x-axis). At time $t_{start}$ a power loss is detected in the power grid 1, and a following frequency disturbance. The battery energy storage 10 is then immediately activated during the initial peak mode, sequence S1, providing e.g. its full power capacity.

Disturbances in the power grid 1 during the transition from the peak mode, S1, to the endurance mode, S3, have to be limited. This may be obtained for instance by a rate limiter applied to the dispatched power order. The power output P from the battery energy storage 10 is then ramped down, sequence S2, suitably in order to avoid another sudden frequency variation in the power grid 1. Finally, in sequence S4, it is ensured that the delivery of power from the battery energy storage 10 to the power grid 1 does not end abruptly. To this end, the power output P from the battery energy storage 10 may be ramped down suitably in dependence on remaining SOC of the battery energy storage 10.

Figure 5:
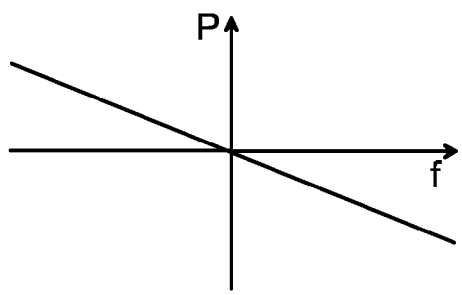
FIG. 5 illustrates frequency droop control.

FIG. 5 illustrates that the power output from the battery energy storage 10 during the endurance mode can be controlled for example by constant droop control.

Figure 6:
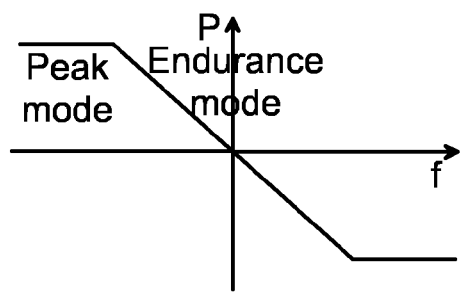
FIG. 6 illustrates a battery energy storage control.

FIG. 6 illustrates an alternative to the above, in particular that the power output from the battery energy storage 10 during the endurance mode can be controlled by the power grid 1 frequency deviation.

The time period during which the battery energy storage 10 is run in the endurance mode can be determined by the function applied, e.g. ramping down 1/T characteristics or similar, which will be exemplified below.

Figure 7:
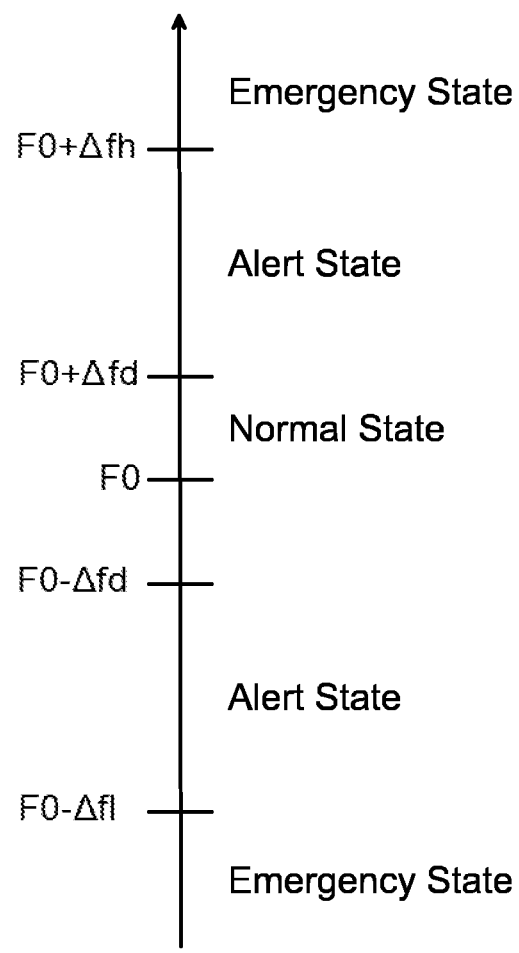
FIG. 7 illustrates exemplifying frequency regions for power grid frequency variation.

The power output from the power compensator 6 can also, as indicated earlier, follow a droop function of the frequency, which is illustrated in FIG. 7. In particular, the peak output level of the power compensator 6 is indicated. The endurance mode described above can be seen as an additional axis, where the output is adjusted after the first peak to withstand the promised time. There are several ways to derive the output level during the endurance mode.

A first approach is to divide the energy available after the peak mode with the desired endurance time and maximize the output to that level.

A slightly more advanced method is to relate the remaining endurance time with the remaining SOC and recalculate an output for instance every second. The SOC energy is then divided by the remaining time to e.g. 15 minutes and the output will have a "1/T" shape in the end (S4 as in FIG. 4). In an ideal case with constant signals this would give the same output as the first method where S3 and S4 in FIG. 4 would then be "straight" lines. In a practical case the frequency varies and it can be beneficial to also include a droop function under the endurance mode but still recognize the 15 minute requirement.

As a practical example the following can be mentioned: If it is known that there is for instance a gas turbine available for starting up, the endurance mode can be made more advanced. Then it is known that it will take about 1-2 minutes to get the gas turbine in operation and then a ramp up of a few minutes to maximum power. The endurance mode can then be made a bit more powerful during the first minutes and then reduce its output more. The ramp S2 in FIG. 4 is then not as steep as illustrated.

FIG. 7 thus illustrates exemplifying frequency regions for power grid frequency variation. A number of frequency regions or intervals may be defined, during which the battery energy source 10 is used in different ways. A normal frequency f0 is defined as the frequency at which the power grid 1 should be run, e.g. 50 Hz in Europe and 60 Hz in USA. The normal frequency f0 may deviate within an interval f0-$\Delta$f_deadband<f0<f0+$\Delta$f_deadband and still be considered normal, and be combatted by means of the primary control, using a dead band.

In an emergency state the frequency deviates from the desired normal frequency f0 with an amount $\Delta$f_low or $\Delta$f_high, i.e. for frequencies above f0+$\Delta$f_high and below f0-$\Delta$f_low the emergency state is entered. In the emergency state, the battery energy state 10 may be used at its full capacity as long as its SOC allows.

In an alert state, for frequency variations outside $\Delta$f_deadband but within the range $\Delta$f_high and $\Delta$f_low, the battery energy storage 10 may be operated as a frequency controlling device with a specified droop constant, i.e. in the endurance mode as described earlier.

Figure 8:
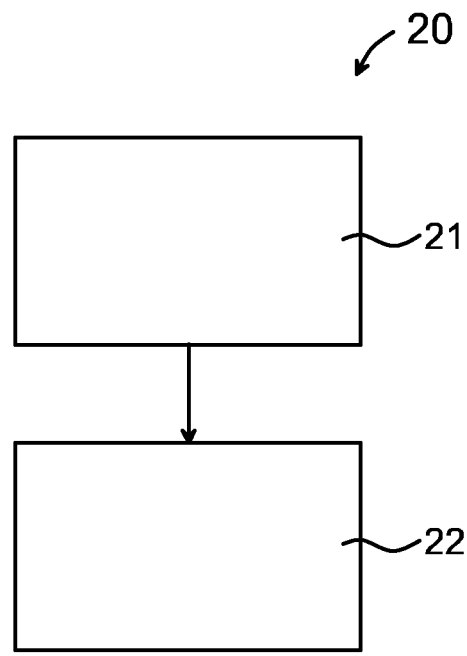
FIG. 8 illustrates a flow chart over steps of a method in accordance with the invention.

FIG. 8 illustrates a flow chart over steps of a method in accordance with the invention. The method 20 is performed in a controller of the power grid 1 comprising the one or more power generation source(s) 3, 4, 5 and the power compensator 6 having a battery energy storage 10. The method 20 comprises the first step of detecting 21 a frequency disturbance within the electricity power system 1 that requires an additional power generation source 3, 4, 5 to be connected to the electricity power system 1 in order to meet a power demand. As mentioned earlier, this detection can be performed in various ways, as the controller 12 receives measurement data and characteristics of the power grid 1.

The method 20 comprises the second step of controlling 22 the power output from the battery energy storage 10 of the power compensator 6 during start-up of the additional power generation source 3, 4, 5. The frequency disturbance occurring in the power grid 1 due to the loss of power generation can thereby be limited.

In an embodiment, the step of controlling 22 the power output from the battery energy storage 10 of the power compensator 6 comprises controlling the power output in a peak mode. The peak mode may comprise a first time period following detection of the frequency disturbance. In the peak mode the battery energy storage 10 is, for example, arranged to provide its full power output capacity to the electric power system 1. The amount of power set to be provided by the battery energy storage 10 is dependent on its capacity as well as on the need within the power grid 1.

In an embodiment, the method 20 comprises the further step of controlling the battery energy storage 10 in an endurance mode. In this mode, the power output of the battery energy storage 10 is utilized alone or in combination with power output from the additional power generation source 3, 4, 5 during a start-up of the additional power generation source 3, 4, 5. As the power from the additional power generation source is increased, the power output from the battery energy source 10 may be decreased.

In an embodiment, the method 20 comprises the further step of, after the endurance mode, ramping down the power output of the battery energy source 10 until the additional power generation source 3, 4, 5 is running at its full capacity.

In an embodiment, the method 20 comprises the further step of ramping down the power output from the battery energy storage 10 from the power output level of the peak mode to the power output level of the endurance mode. Unwanted sudden frequency changes is thereby avoided.

Figure 9:
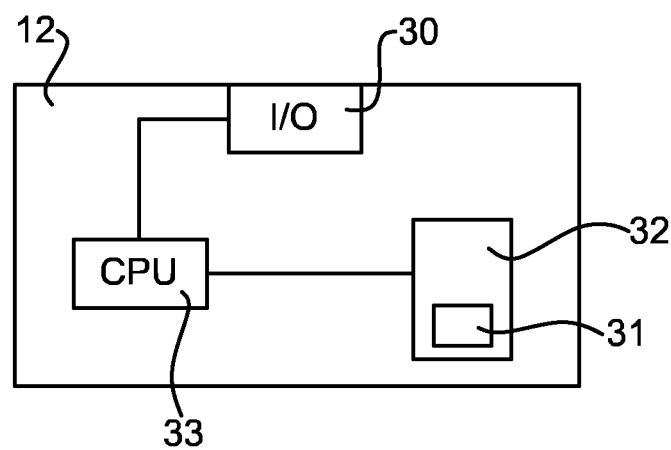
FIG. 9 illustrates means for implementing methods of FIG. 8, and in particular a controller.

The invention also encompasses the controller 12. FIG. 9 illustrates the controller 12 and in particular means for implementing the described methods. The controller 12 comprises a processor 33, e.g. a central processing unit, microcontroller, digital signal processor (DSP), etc., capable of executing software instructions stored in a computer program product 32 e.g. in the form of a memory. The processor 33 is connected to an input/output device 30 that receives inputs from remote measurement devices and/or from control systems such as SCADA, as mentioned earlier. It is noted that although only one processor 33 is illustrated in FIG. 8, the implementation may comprise distributed hardware so that several CPUs are used rather than one when running the software.

The described methods and algorithms or parts thereof for use in controlling the power compensator 6 may be implemented e.g. by software and/or application specific integrated circuits in the controller 12. To this end, the controller 12 may further comprise a computer program 31 stored on the computer program product 32.

With reference still to FIG. 9, the invention also encompasses such computer program 31 for controlling the power compensator 6. The computer program 31 comprises computer program code which when run on the controller 12, and in particular the processor 33 thereof, causes the controller 12 to perform the methods as described.

The computer program product 32 is also provided comprising the computer program 31 and computer readable means on which the computer program 31 is stored. The computer program product 33 can be any combination of read and write memory (RAM) or read only memory (ROM). The computer program product 62 may also comprise persistent storage, which, for example can be any single one or combination of magnetic memory, optical memory, or solid state memory.

A difference between the invention, as described in various aspects, and today's solution can be summarized according to: when frequency drops due to lost production, if the energy storage then operates at its maximum level until SOC=0 no known remedy actions will have the same chance to support the grid in a favorable way. The high output of the energy storage is 'curtailing' the need of additional response. If on the other hand the output of the energy storage always is limited such that it can inject power for e.g. "15 minutes" when the frequency goes outside the deadband, the power system might not survive more than a few seconds due to the time lag in power production. The ramp rates for e.g. a thermal power plant may be up to 10% within a reasonably short timeframe (seconds) and then in the order of 1-3(4) % per minute. A hydro power plant may be in the 5% change per second with usually a non minimum phase step response.

What is claimed is:

1. A method in an electric power system comprising one or more power generation source(s) and a dynamic power compensator having a battery energy storage and having a voltage source converter or a static synchronous compensator connected at a DC side thereof to the battery energy storage, the method comprising the steps of:
   measuring, with a measurement device, the state of charge of the battery energy storage,
   detecting, with a controller, a frequency drop within the electricity power system requiring an additional power generation source to be connected to the electricity power system in order to meet a power demand, and
   controlling, with the controller, the power output from the battery energy storage of the dynamic power compensator during start-up of the additional power generation source, thereby limiting the frequency drop within the electric power system, said power output being controlled in dependence on the state of charge.

2. The method as claimed in claim 1, wherein the step of controlling the power output from the battery energy storage of the dynamic power compensator comprises controlling the power output in a peak mode.

3. The method as claimed in claim 1, comprising the further step of:
   controlling the battery energy storage in an endurance mode, during which the power output of the battery energy storage is utilized alone or in combination with power output from the additional power generation source during a start-up of the additional power generation source.

4. The method as claimed in claim 3, wherein the power output from the battery energy storage is controlled by frequency droop or by frequency deviation of the electric power system.

5. The method as claimed in claim 3, comprising the further step of, after the endurance mode, ramping down the power output of the battery energy source until the additional power generation source is running at its full capacity.

6. The method as claimed in claim 3, comprising a further step of ramping down the power output from the battery energy storage from the power output level of the peak mode to the power output level of the endurance mode.

7. The method as claimed in claim 2, wherein the peak mode comprises a first time period upon detection of a frequency disturbance, in which peak mode the battery energy storage is arranged to provide its full power output capacity to the electric power system.

8. The method as claimed in claim 1, wherein a frequency disturbance results from the loss of one of the power generation sources.

9. A controller for controlling a dynamic power compensator having a battery energy storage and having a voltage source converter or a static synchronous compensator connected at a DC side thereof to the battery energy storage, the dynamic power compensator being connected to an electric power system comprising one or more power generation source, the controller arranged to:

receive measurements of the battery state of charge of the battery energy storage, detect a frequency drop within the electricity power system requiring an additional power generation source to be connected to the electricity power system in order to meet a power demand, and control the power output from the battery energy storage of the dynamic power compensator during start-up of the additional power generation source, thereby limiting the frequency drop within the electric power system, said power output being controlled in dependence on the state of charge.

10. A computer program for a controller controlling a dynamic power compensator comprising a battery energy storage and comprising a voltage source converter or a static synchronous compensator connected at a DC side thereof to the battery energy storage, the dynamic power compensator being connected to an electric power system, the computer program comprising computer program code stored on non-transitory computer readable media, which, when run on the controller, causes the controller to perform the steps of:

receiving measurements of the battery state of charge of the battery energy storage, detecting a frequency drop within the electricity power system requiring an additional power generation source to be connected to the electricity power system in order to meet a power demand, and controlling the power output from the battery energy storage of the dynamic power compensator during start-up of the additional power generation source, thereby limiting the frequency drop within the electric power system, said power output being controlled in dependence on the state of charge.

11. A computer program product comprising a computer program as claimed in claim 10, and a non-transitory computer readable means on which the computer program is stored.

12. An electric power system comprising one or more power generation source(s) and a dynamic power compensator having a battery energy storage and having a voltage source converter or a static synchronous compensator connected at a DC side thereof to the battery energy storage, the electric power system further comprising a controller arranged to connect, upon detection of a frequency drop within the electricity power system requiring an additional power generation source to be added to the electricity power system in order to meet a power demand, the battery energy storage to provide output power to the electrical power system during start-up of the additional power generation source, thereby limiting the frequency drop within the electric power system, wherein said power output being controlled in dependence on the state of charge of the battery energy storage.

13. The method as claimed in claim 1, wherein the power compensator is connected to the battery energy storage on its DC side, and connected in parallel to a capacitor bank.

14. The controller as claimed in claim 9, wherein the power compensator is connected to the battery energy storage on its DC side, and connected in parallel to a capacitor bank.

15. The computer program as claimed in claim 10, wherein the power compensator is connected to the battery energy storage on its DC side, and connected in parallel to a capacitor bank.

16. The system as claimed in claim 12, wherein the battery energy storage is activated during an initial peak mode.

* * * * *